(12) United States Patent
Burns et al.

(10) Patent No.: US 11,319,900 B2
(45) Date of Patent: *May 3, 2022

(54) CHARGE FORMING DEVICE WITH ELECTRICALLY ACTUATED VAPOR SEPARATOR VENT VALVE

(71) Applicant: Walbro LLC, Tucson, AZ (US)

(72) Inventors: Gary J. Burns, Millington, MI (US); Albert L. Sayers, Caro, MI (US)

(73) Assignee: Walbro LLC, Cass City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,018

(22) Filed: May 18, 2021

(65) Prior Publication Data

US 2021/0270211 A1    Sep. 2, 2021

Related U.S. Application Data

(63) Continuation of application No. 16/645,818, filed as application No. PCT/US2018/050548 on Sep. 12, 2018, now Pat. No. 11,041,465.

(Continued)

(51) Int. Cl.
*F02D 41/02* (2006.01)
*F02M 9/08* (2006.01)
(Continued)

(52) U.S. Cl.
CPC ............... *F02M 9/08* (2013.01); *B60K 15/03* (2013.01); *F02D 9/1035* (2013.01);
(Continued)

(58) Field of Classification Search
CPC ............ F02M 9/08; F02M 9/10; F02M 7/127; F02M 25/0836; B60K 15/03; F02D 9/10;
(Continued)

(56) References Cited

U.S. PATENT DOCUMENTS 4,279,233 A    7/1981    Tobita et al.
4,283,356 A    8/1981    Arai et al.
(Continued)

FOREIGN PATENT DOCUMENTS

CN    2145875 Y    11/1993
CN    1796759 A    7/2006
(Continued)

OTHER PUBLICATIONS

Written Opinion & International Search Report for PCT/US2018/050548 dated Jan. 8, 2019, 13 pages.
(Continued)

*Primary Examiner* — Hai H Huynh
(74) *Attorney, Agent, or Firm* — Reising Ethington P.C.; Matthew J. Schmidt (57) ABSTRACT

A charge forming device includes a housing having an inlet chamber in which a supply of fuel is received, a vent passage communicating with the inlet chamber and a throttle bore with an inlet through which air is received, a throttle valve carried by the housing with a valve head movable relative to the throttle bore to control fluid flow through the throttle bore, a vent valve. The vent valve is carried by the housing and has a valve element that is movable between an open position wherein fluid may flow from the inlet chamber through the vent passage and a closed position where fluid is prevented or inhibited from flowing out of the inlet chamber through the vent passage, the vent valve being electrically actuated, and wherein the vent valve is actuated as a function of a pressure within the inlet chamber or the vent passage.

15 Claims, 5 Drawing Sheets

Related U.S. Application Data (60) Provisional application No. 62/558,522, filed on Sep. 14, 2017.

(51) Int. Cl.

| | | |
|---|---|---|
| *B60K 15/03* | (2006.01) | |
| *F02D 9/10* | (2006.01) | |
| *F02D 41/00* | (2006.01) | |
| *F02M 7/127* | (2006.01) | |
| *F02M 9/10* | (2006.01) | |
| *F02M 25/08* | (2006.01) | |

(52) U.S. Cl.
CPC ....... *F02D 41/0002* (2013.01); *F02D 41/003* (2013.01); *F02M 7/127* (2013.01); *F02M 9/10* (2013.01); *F02M 25/0836* (2013.01)

(58) Field of Classification Search
CPC ... F02D 9/1035; F02D 41/0002; F02D 41/003
USPC .......................... 123/375, 376, 385, 390, 337
See application file for complete search history.

(56) References Cited

U.S. PATENT DOCUMENTS

| | | | |
|---|---|---|---|
| 4,330,489 | A | 5/1982 | Ito |
| 4,524,746 | A | 6/1985 | Hansen |
| 4,694,797 | A | 9/1987 | Hamai |
| 4,951,643 | A | 8/1990 | Sato et al. |
| 5,207,207 | A | 5/1993 | Pedersen |
| 5,226,400 | A | 7/1993 | Birch |
| 5,386,145 | A | 1/1995 | Boswell |
| 5,460,149 | A | 10/1995 | Tofel et al. |
| 7,263,981 | B2 | 9/2007 | Woody |
| 7,287,742 | B2 | 10/2007 | Burns |
| 7,424,884 | B2 | 9/2008 | Woody |
| 7,429,033 | B2 | 9/2008 | Seki et al. |
| 7,467,785 | B2 | 12/2008 | Braun |
| 7,568,472 | B2 | 8/2009 | Woody |
| 8,020,576 | B2 | 9/2011 | Lauber et al. |
| 8,539,937 | B2 | 9/2013 | Kobayashi |
| 9,631,736 | B2 | 4/2017 | Kus et al. |
| 11,008,951 | B2 * | 5/2021 | Burns ..................... F02M 9/08 |
| 2001/0029700 | A1 | 10/2001 | Terakado |
| 2004/0195705 | A1 | 10/2004 | Burns |
| 2013/0054121 | A1 | 2/2013 | Casoni et al. |
| 2013/0104849 | A1 | 5/2013 | Bruener et al. |
| 2014/0251270 | A1 | 9/2014 | Bellistri et al. |
| 2019/0120193 | A1 | 4/2019 | Burns et al. |

FOREIGN PATENT DOCUMENTS

| | | |
|---|---|---|
| CN | 1800618 A | 7/2006 |
| CN | 1880752 A | 12/2006 |
| CN | 101139957 A | 3/2008 |
| CN | 102278246 A | 12/2011 |
| JP | S6296776 A | 5/1987 |
| TW | 200835877 A | 9/2008 |

OTHER PUBLICATIONS

Dongjiang, Li, et al.—Small Internal Combustion Engines, Solid-State Circuit-Jet Technology Hybrid Control Fuel Injections System; China Academic Journal Electronic Publishing House; www.cnki.net; dated Apr. 25, 1994 (7 pages).

CN Office Action for CN Application No. 201880059691.9 dated Jul. 21, 2021 (12 pages).

* cited by examiner

CHARGE FORMING DEVICE WITH ELECTRICALLY ACTUATED VAPOR SEPARATOR VENT VALVE

REFERENCE TO CO-PENDING APPLICATION

This application is a continuation of U.S. patent application Ser. No. 16/645,818 filed Mar. 10, 2020, which is a national phase of PCT/US2018/050548, filed Sep. 12, 2018 and claims the benefit of U.S. Provisional Application No. 62/558,522 filed Sep. 14, 2017. The entire contents of these priority applications are incorporated herein by reference in their entireties.

TECHNICAL FIELD

The present disclosure relates generally to a charge forming device for supplying fuel and air to an engine, and more specifically a charge forming device having an electrically actuated vapor separator vent valve.

BACKGROUND

A variety of fuel injection throttle body configurations are known for supplying a fuel and air mixture to an internal combustion engine to support its operation in which gasoline is injected into a main bore at a relatively high pressure typically in the range of 6 to 40 psi and sometimes up to 80 psi or more above ambient atmospheric pressure or 21 to 55 psia or more to facilitate mixing or dispersion of the liquid fuel in the fuel and air mixture supplied to the engine. A fuel pump and pressure regulator supply liquid fuel at this high pressure to a fuel metering valve or injector which is opened and closed by an electronic controller at defined times to discharge the appropriate quantity of fuel into the main bore for the current operating condition of the engine. Typically the fuel injector is located upstream of a throttle valve head or much further downstream of the throttle body and proximate to the engine fuel intake port or engine intake valve pocket.

SUMMARY

In at least some implementations, a charge forming device for a combustion engine, includes a housing having an inlet chamber in which a supply of fuel is received, a vent passage communicating with the inlet chamber and a throttle bore with an inlet through which air is received, a throttle valve carried by the housing with a valve head movable relative to the throttle bore to control fluid flow through the throttle bore, a vent valve. The vent valve is carried by the housing and has a valve element that is movable between an open position wherein fluid may flow from the inlet chamber through the vent passage and a closed position where fluid is prevented or inhibited from flowing out of the inlet chamber through the vent passage, the vent valve being electrically actuated, and wherein the vent valve is actuated as a function of a pressure within the inlet chamber or the vent passage.

In at least some implementations, the vent valve is actuated to maintain a pressure within the inlet chamber of between 0.34 mmHg to 19 mmHg.

In at least some implementations, a controller is carried by the housing, and a pressure sensor is communicated with the controller. The pressure sensor is responsive to pressure in the vent passage or the intake manifold, and the controller causes the valve element to move to the closed position when there is a subatmospheric pressure in said vent passage or intake manifold.

In at least some implementations, a controller is carried by the housing, and a pressure sensor is communicated with the controller. The pressure sensor is responsive to pressure in the inlet chamber, and the controller causes the valve element to move to the closed position until a threshold superatmospheric pressure exists in the inlet chamber. In at least some implementations, the controller causes the valve element to move to the open position when there is a superatmospheric pressure in said vent passage or intake manifold to provide a superatmospheric pressure signal to the inlet chamber.

In at least some implementations, the system includes a fuel tank having a fuel outlet communicating with the inlet chamber, and a vent outlet communicating with at least one of the inlet chamber and the vent passage wherein, when the valve element is in the open position gaseous matter may flow from the vent outlet of the fuel tank to one or both of the throttle bore and the intake manifold, and when the valve element is in the closed position gaseous matter is prevented or inhibited from flowing out of the vent outlet of the fuel tank. In at least some implementations, when the valve element is in the closed position, liquid fuel in the fuel tank is prevented from flowing out of the vent outlet of the fuel tank.

In at least some implementations, the housing includes a body and a cover, and the vent passage is formed entirely in the cover.

In at least some implementations, a method of operating a vent valve for a charge forming device, wherein the charge forming device includes a housing having an inlet chamber in which a supply of fuel is received, a vent passage communicating with the inlet chamber and a throttle bore with an inlet through which air is received, a throttle valve carried by the housing with a valve head movable relative to the throttle bore to control fluid flow through the throttle bore, wherein the method includes determining a pressure within the inlet chamber or the vent passage or an intake manifold of an engine with which the charge forming device used, and controlling the vent valve as a function of the determined pressure.

In at least some implementations, the step of controlling the vent valve is accomplished by closing the vent valve when the determined pressure is subatmospheric. In at least some implementations, the step of controlling the vent valve is accomplished by opening the vent valve when the determined pressure is superatmospheric.

In at least some implementations, the determined pressure is a pressure within the inlet chamber and wherein the step of controlling the vent valve is accomplished by opening the vent valve when the determined pressure is greater than a threshold pressure. In at least some implementations, the threshold pressure is between 0.34 mmHg and 19 mmHg.

In at least some implementations, the vent valve is opened and closed repeatedly with a cycle time between 1.5 ms to 22 ms.

In at least some implementations, the opening of the valve is timed with pressure pulses created in the engine.

In at least some implementations, a charge forming device for a combustion engine includes a housing, a throttle valve and a vent valve. The housing has an inlet chamber in which a supply of fuel is received, a vent passage communicating with the inlet chamber and a throttle bore with an inlet through which air is received. The throttle valve is carried by the housing and has a valve head movable relative to the throttle bore to control fluid flow through the throttle bore. And the vent valve is electrically actuated, carried by the housing and has a valve element that is movable between an open position wherein fluid may flow from the inlet chamber through the vent passage and a closed position where fluid is prevented or inhibited from flowing out of the inlet chamber through the vent passage.

In at least some implementations, the housing includes a body and a cover coupled to the body, and the vent passage is formed at least partially in the cover and the vent valve is carried by the cover. The vent valve may be actuated as a function of a pressure within the inlet chamber, such as to maintain a pressure between 0.34 mmHg to 19 mmHg.

In at least some implementations, an electrically actuated fuel metering valve is carried by the housing and has an inlet communicated with the inlet chamber to receive fuel from the inlet chamber and an outlet communicated with the throttle bore and through which fuel is supplied into the throttle bore. Actuation of both the fuel metering valve and the vent valve may be controlled by a single controller, and the controller may be carried by the housing. The throttle valve may be electrically actuated and actuation of both the fuel metering valve and the throttle valve may be controlled by a single controller. In at least some implementations, actuation of each of the fuel metering valve, the throttle valve and the vent valve is controlled by a single controller.

In at least some implementations, an inlet valve is carried by the housing and has a valve that controls the flow of fuel into the inlet chamber. The inlet valve may be coupled to a float received within the inlet chamber that actuates the inlet valve as a function of the level of fuel within the inlet chamber. A second vent passage may be provided that provides gaseous matter from a second source, such as a fuel tank, to the inlet chamber, wherein flow of gaseous matter from the inlet chamber and from the second source is controlled by the vent valve.

In at least some implementations, a fuel system includes a fuel tank, a throttle body assembly, and a vent valve. The fuel tank has a fuel outlet and a vent outlet. The throttle body assembly includes an inlet chamber in communication with the fuel outlet to receive fuel from the tank and with the vent outlet to receive gaseous matter from the tank into the inlet chamber. The throttle body assembly also includes a vent passage from which gasses may be vented from the inlet chamber. The vent valve is carried by the throttle body assembly to control venting of the inlet chamber and of the fuel tank.

In at least some implementations, a float is received within the inlet chamber, and an inlet valve is coupled to the float so that the inlet valve is actuated by the float as a function of the level of fuel within the inlet chamber.

In at least some implementations, the throttle body includes a throttle bore with an inlet through which air is received, and an electrically actuated fuel metering valve is carried by the housing and has an inlet communicated with the inlet chamber to receive fuel from the inlet chamber and an outlet communicated with the throttle bore and through which fuel is supplied into the throttle bore. Actuation of both the fuel metering valve and the vent valve may be controlled by a single controller.

In at least some implementations, a second vent passage provides gaseous matter from a second source to the inlet chamber, and flow of gaseous matter from the inlet chamber and from the second source is controlled by the vent valve. The vent valve may be actuated as a function of a pressure within the inlet chamber, such as to maintain a pressure between 0.34 mmHg to 19 mmHg.

BRIEF DESCRIPTION OF THE DRAWINGS

The following detailed description of certain embodiments and best mode will be set forth with reference to the accompanying drawings, in which.

DETAILED DESCRIPTION

Figure 1:
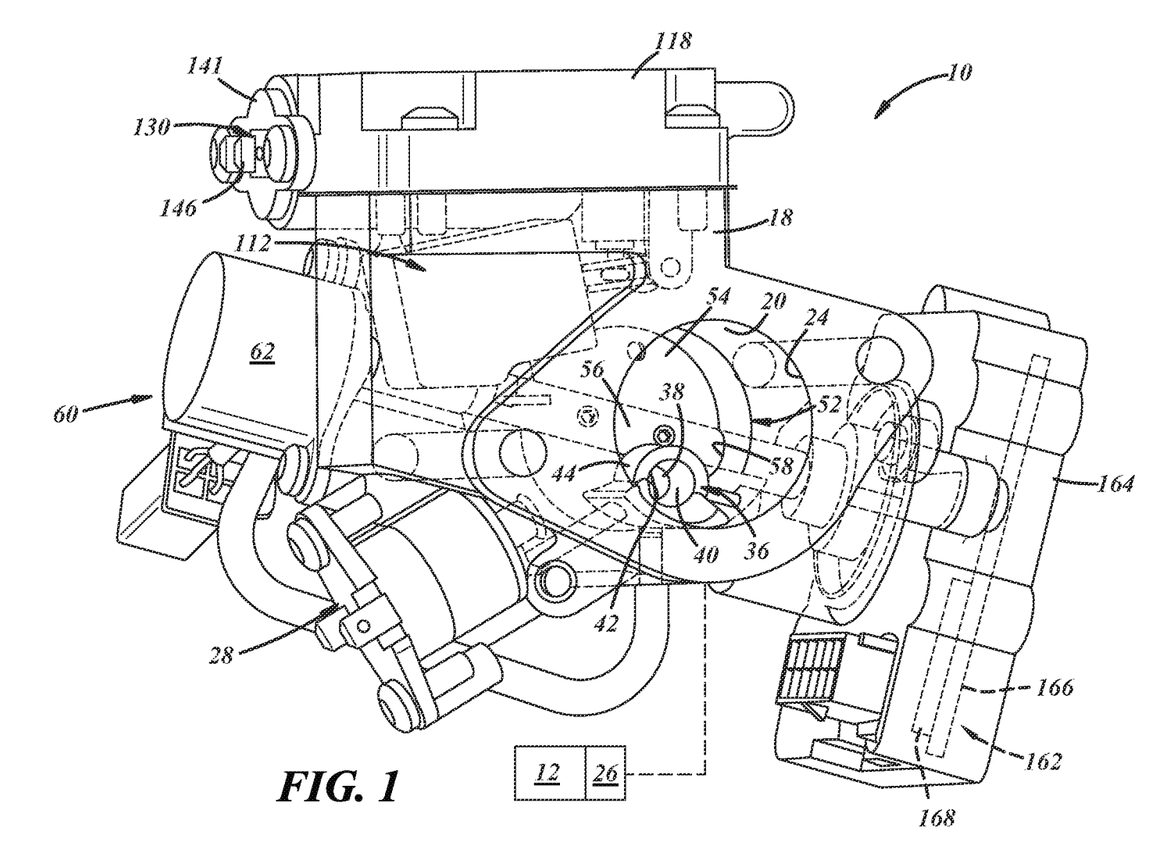
FIG. 1 is a perspective view of a throttle body assembly with an electrically actuated vent valve.
Figure 2:
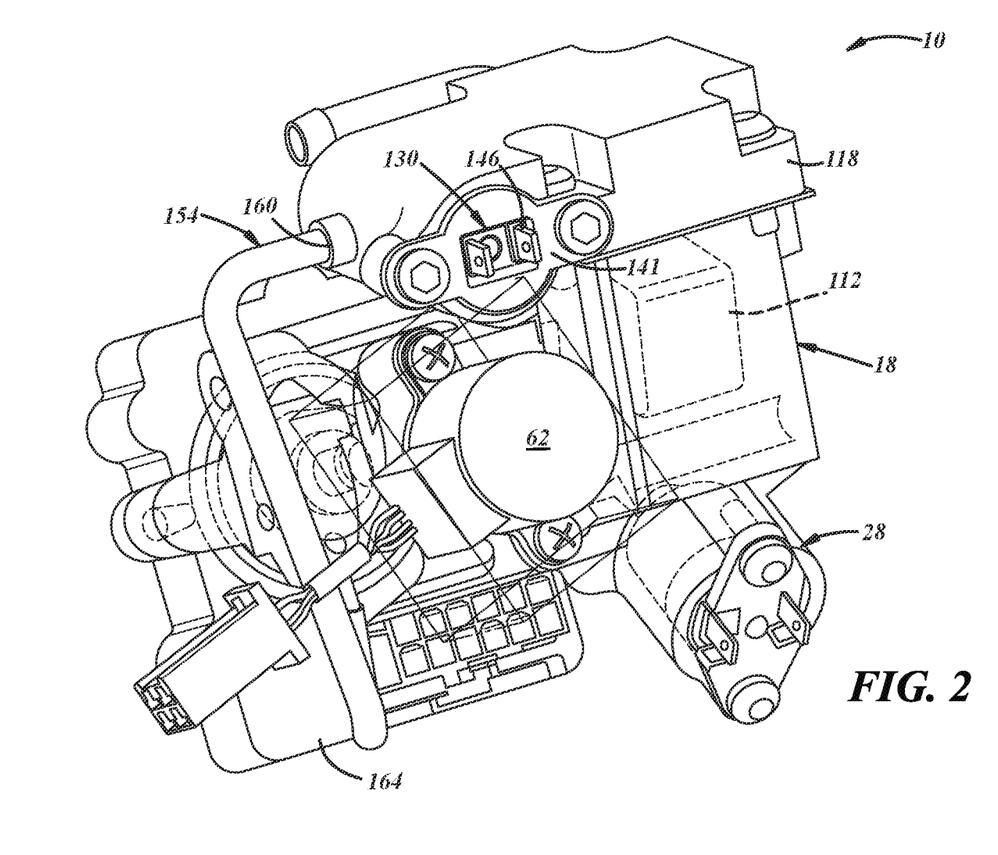
FIG. 2 is perspective view of the throttle body assembly.
Figure 3:
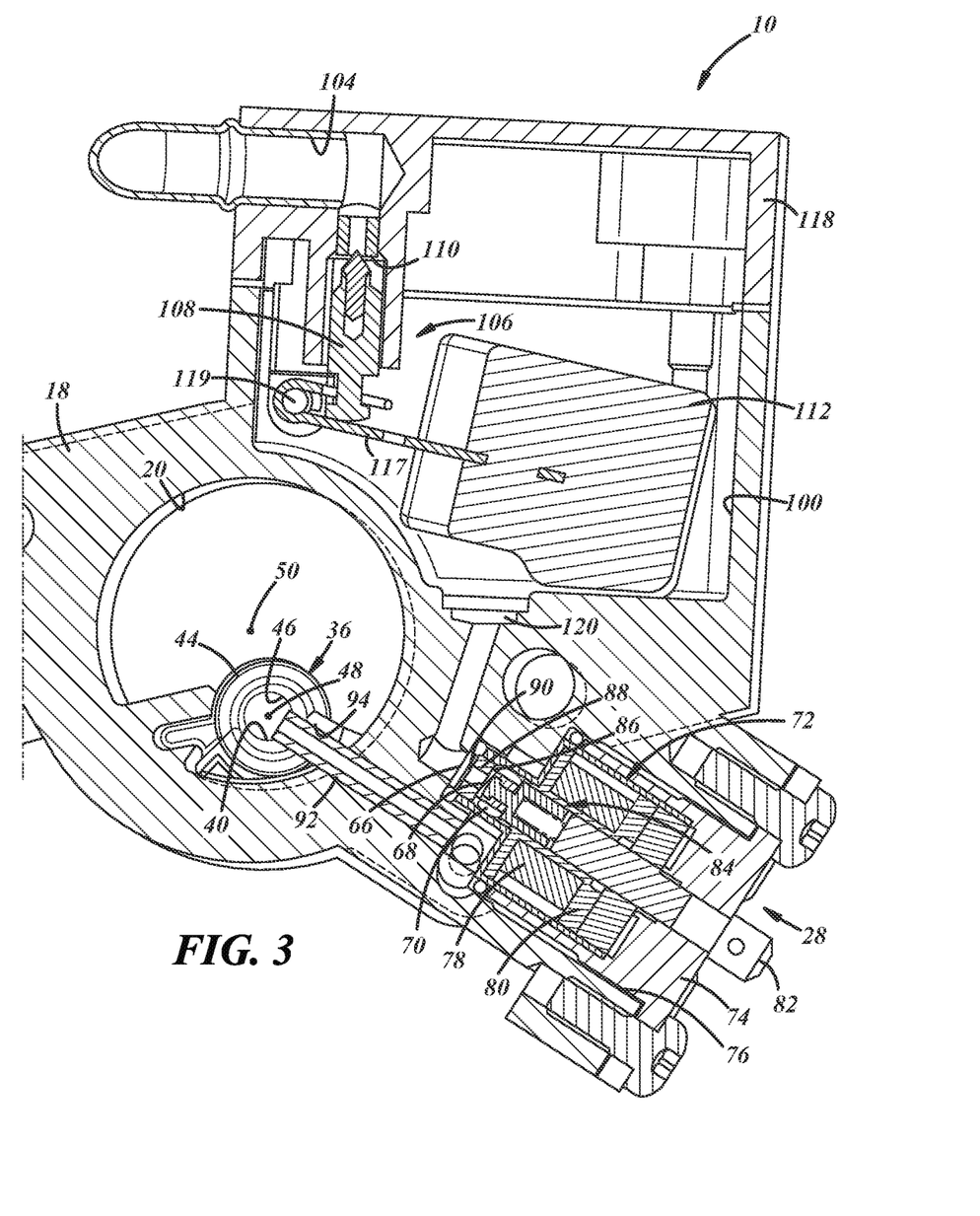
FIG. 3 is a cross-sectional view of the throttle body assembly illustrating an inlet valve and a fuel metering valve.

Referring in more detail to the drawings, FIGS. 1-3 illustrate a charge forming device 10 that provides a combustible fuel and air mixture to an internal combustion engine 12 (shown schematically in FIG. 1) to support operation of the engine. The charge forming device 10 may be utilized on a two or four-stroke internal combustion engine, and in at least some implementations, includes a throttle body assembly 10 from which air and fuel are discharged for delivery to the engine.

The assembly 10 includes a housing having a throttle body 18 that has a throttle bore 20 with an inlet (not shown) through which air is received into the throttle bore 20 and an outlet 24 connected or otherwise communicated with the engine (e.g. an intake manifold 26 thereof). The inlet may receive air from an air filter (not shown), if desired, and that air may be mixed with fuel provided from a fuel metering valve 28 carried by or communicated with the throttle body 18. The intake manifold 26 generally communicates with a combustion chamber or piston cylinder of the engine during sequentially timed periods of a piston cycle. For a four-stroke engine application, as illustrated, the fluid may flow through an intake valve and directly into the piston cylinder. Alternatively, for a two-stroke engine application, typically air flows through the crankcase (not shown) before entering the combustion chamber portion of the piston cylinder through a port in the cylinder wall which is opened intermittently by the reciprocating engine piston.

The throttle bore 20 may have any desired shape including (but not limited to) a constant diameter cylinder or a venturi shape (FIG. 5) wherein the inlet leads to a tapered converging portion that leads to a reduced diameter throat that in turn leads to a tapered diverging portion that leads to the outlet 24. The converging portion may increase the velocity of air flowing into the throat and create or increase a pressure drop in the area of the throat. In at least some implementations, a secondary venturi, sometimes called a boost venturi 36 may be located within the throttle bore 20 whether the throttle bore 20 has a venturi shape or not. The boost venturi 36 may have any desired shape, and as shown in FIGS. 1 and 3, has a converging inlet portion 38 that leads to a reduced diameter intermediate throat 40 that leads to a diverging outlet 42. The boost venturi 36 may be coupled the to throttle body 18 within the throttle bore 20, and in some implementations, the throttle body may be cast from a suitable metal and the boost venturi 36 may be formed as part of the throttle body, in other words, from the same piece of material cast as a feature of the throttle body when the remainder of the throttle body is formed. The boost venturi 36 may also be an insert coupled in any suitable manner to the throttle body 18 after the throttle body is formed. In the example shown, the boost venturi 36 includes a wall 44 that defines an inner passage 46 that is open at both its inlet 38 and outlet 42 to the throttle bore 20. A portion of the air that flows through the throttle body 18 flows into and through the boost venturi 36 which increases the velocity of that air and decreases the pressure thereof. The boost venturi 36 may have a center axis 48 (FIG. 3) that may be generally parallel to a center axis 50 (FIG. 3) of the throttle bore 20 and radially offset therefrom, or the boost venturi 36 may be oriented in any other suitable way.

Referring to FIG. 1, the air flow rate through the throttle bore 20 and into the engine is controlled at least in part by a throttle valve 52. In at least some implementations, the throttle valve 52 includes a head 54 which may include a flat plate disposed in the throttle bore 20 and coupled to a rotating throttle valve shaft 56. The shaft 56 extends through a shaft bore 58 formed in the throttle body 18 that intersects and may be generally perpendicular to the throttle bore 20. The throttle valve 52 may be driven or moved by an actuator 60 between an idle position wherein the head 54 substantially blocks air flow through the throttle bore 20 and a fully or wide open position wherein the head 54 provides the least restriction to air flow through the throttle bore 20. In one example, the actuator 60 may be an electrically driven motor 62 coupled to the throttle valve shaft 56 to rotate the shaft and thus rotate the valve head within the throttle bore 20. In another example, the actuator 60 may include a mechanical linkage, such as a lever attached to the throttle valve shaft 56 to which a Bowden wire may be connected to manually rotate the shaft 56 as desired and as is known in the art.

The fuel metering valve 28 (FIG. 3) may have an inlet 66 to which fuel is delivered, a valve element 68 (e.g. a valve head) that controls fuel flow rate and an outlet 70 downstream of the valve element 68. To control actuation and movement of the valve element 68, the fuel metering valve 28 may include or be associated with an electrically driven actuator 72 such as (but not limited to) a solenoid. Among other things, the solenoid 72 may include an outer casing 74 received within a cavity 76 in the throttle body 18, a coil 78 wrapped around a bobbin 80 received within the casing 74, an electrical connector 82 arranged to be coupled to a power source to selectively energize the coil 78, and an armature 84 slidably received within the bobbin 80 for reciprocation between advanced and retracted positions. The valve element 68 may be carried by or otherwise moved by the armature 84 relative to a valve seat 86 that may be defined within one or both of the solenoid 72 and the throttle body 18. When the armature 84 is in its retracted position, the valve element 68 is removed or spaced from the valve seat 86 and fuel may flow through the valve seat. When the armature 84 is in its extended position, the valve element 68 may be closed against or bears on the valve seat 86 to inhibit or prevent fuel flow through the valve seat. The solenoid 72 may be constructed as set forth in U.S. patent application Ser. No. 14/896,764. The inlet 68 may be centrally or generally coaxially located with the valve seat 86, and the outlet 70 may be radially outwardly spaced from the inlet and generally radially outwardly oriented. Of course, other metering valves, including but not limited to different solenoid valves or commercially available fuel injectors, may be used instead if desired in a particular application.

In the example shown, the valve seat 86 is defined within the cavity 76 of the throttle body 18 and may be defined by a feature of the throttle body or by a component inserted into and carried by the throttle body or the solenoid casing 74. Also in the example shown, the valve seat 86 is defined by a metering jet 88 carried by the throttle body 18. The jet 88 may be a separate body press-fit or otherwise installed into the cavity 76 and having a passage or orifice 90 through which fuel at the inlet 66 to the metering valve 28 flows before reaching the valve seat 86 and valve element 68. The flow area of passages downstream of the jet 88 may be greater in size than the minimum flow area of the jet so that the jet provides the maximum restriction to fuel flow through the metering valve 28. Instead of or in addition to the jet 88, a passage of suitable size may be drilled or otherwise formed in the throttle body 18 to define a maximum restriction to fuel flow through the metering valve 28. Use of a jet 88 may facilitate use of a common throttle body design with multiple engines or in different engine applications wherein different fuel flow rates may be needed. To achieve the different flow rates, different jets having orifices with different effective flow areas may be inserted into the throttle bodies while the remainder of the throttle body may be the same. Also, different diameter passages may be formed in the throttle body 18 in addition to or instead of using a jet 88, to accomplish a similar thing.

Fuel that flows through the valve seat 86 (e.g. when the valve element 68 is moved from the valve seat by retraction of the armature 84), flows to the metering valve outlet 70 for delivery into the throttle bore 20. In at least some implementations, fuel that flows through the outlet 70 is directed into the boost venturi 36, when a boost venturi 36 is included in the throttle bore 20. In implementations where the boost venturi 36 is spaced from the outlet 70, an outlet tube 92 (FIG. 3) may extend from a passage or port defining at least part of the outlet 70 and through an opening 94 in the boost venturi wall 44 to communicate with the boost venturi passage 46. The tube 92 may extend into and communicate with the throat 40 of the boost venturi 36 wherein a negative or subatmospheric pressure signal may be of greatest magnitude, and the velocity of air flowing through the boost venturi 36 may be the greatest. Of course, the tube 92 may open into a different area of the boost venturi 36 as desired. Further, the tube 92 may extend through the wall 44 so that an end of the tube projects into the boost venturi passage 46, or the tube may extend through the boost venturi passage so that an end of the tube intersects the opposite wall of the boost venturi and may include holes, slots or other features through which fuel may flow into the boost venturi passage 46, or the end of the tube may be within the opening 94 and recessed or spaced from the passage (i.e. not protruding into the passage).

Fuel may be provided from a fuel source to the metering valve inlet 66 and, when the valve element 68 is not closed on the valve seat 86, fuel may flow through the valve seat and the metering valve outlet 70 and to the throttle bore 20 to be mixed with air flowing therethrough and to be delivered as a fuel and air mixture to the engine. The fuel source may provide fuel at a desired pressure to the metering valve 28. In at least some implementations, the pressure may be ambient pressure or a slightly superatmospheric pressure up to about, for example, 6 psi above ambient pressure.

Figures 4, 6:
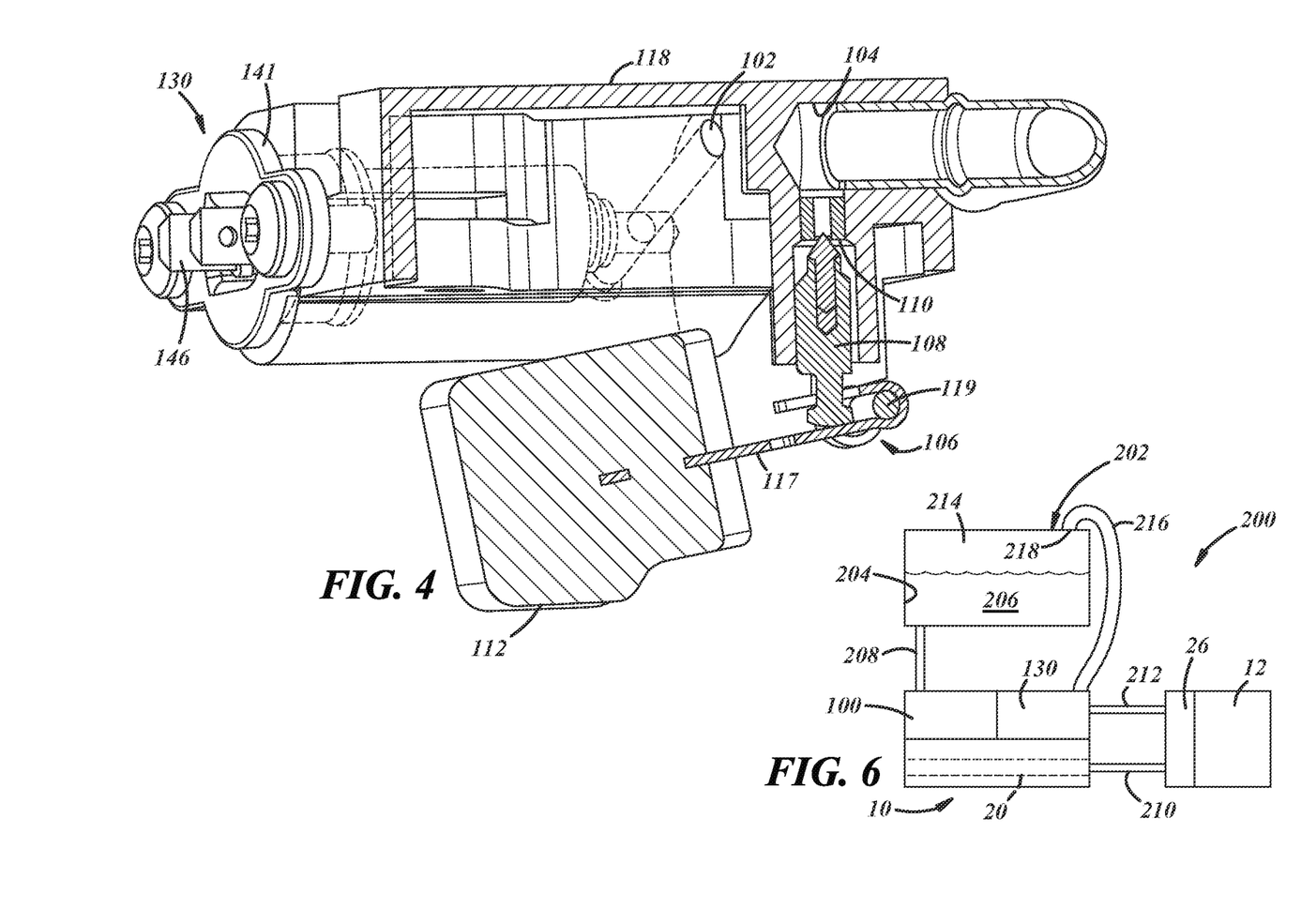
FIG. 4 is a perspective and partially sectioned view of a cover, inlet valve and vent valve of the throttle body assembly.
FIG. 6 is a diagrammatic view of a fuel system including a fuel tank, throttle body assembly and an engine.

To provide fuel to the metering valve inlet 66, the throttle body assembly 10 may include an inlet chamber 100 (FIG. 3) into which fuel is received from a fuel supply, such as a fuel tank. The throttle body assembly 10 may include a fuel inlet 104 leading to the inlet chamber 100. In a system in which the fuel pressure is generally at atmospheric pressure, the fuel flow may be fed under the force of gravity to the inlet chamber 100. In at least some implementations, as shown in FIGS. 3 and 4, a valve assembly 106 may control the flow of fuel into the inlet chamber 100. The valve assembly 106 may include a valve element 108 and may include or be associated with a valve seat 110 so that a portion of the valve element 108 is selectively engageable with the valve seat 110 to inhibit or prevent fluid flow through the valve seat, as will be described in more detail below. The valve element 108 may be coupled to an actuator 112 that moves the valve 108 relative to the valve seat 110, as will be set forth in more detail below. A vent port or passage 102 (FIGS. 4 and 5) may be communicated with the inlet chamber and with the engine intake manifold or elsewhere as desired so long as the desired pressure within the inlet chamber 100 is achieved in use, which may include atmospheric pressure. The level of fuel within the inlet chamber 100 provides a head or pressure of the fuel that may flow through the metering valve 28 when the metering valve is open.

To maintain a desired level of fuel in the inlet chamber 100, the valve 108 is moved relative to the valve seat 110 by the actuator 112 which, in the example shown, includes or is defined by a float that is received in the inlet chamber and is responsive to the level of fuel in the inlet chamber. The float 112 may be buoyant in fuel and provide a lever 117 pivotally coupled to the throttle body 18 or a cover 118 coupled to the body 18 on a pin 119 and the valve 108 may be connected to the float 112 for movement as the float moves in response to changes in the fuel level within the inlet chamber 100. When a desired maximum level of fuel is present in the inlet chamber 100, the float 112 has been moved to a position in the inlet chamber wherein the valve 108 is engaged with and closed against the valve seat 110, which closes the fuel inlet 104 and prevents further fuel flow into the inlet chamber 100. As fuel is discharged from the inlet chamber 100 (e.g. to the throttle bore 20 through the metering valve 28), the float 112 moves in response to the lower fuel level in the inlet chamber and thereby moves the valve 108 away from the valve seat 110 so that the fuel inlet 104 is again open. When the fuel inlet 104 is open, additional fuel flows into the inlet chamber 100 until a maximum level is reached and the fuel inlet 104 is again closed.

The inlet chamber 100 may be defined at least partially by the throttle body 18, such as by a recess formed in the throttle body, and a cavity 121 in the cover 118 carried by the throttle body and defining part of the housing of the throttle body assembly 10. An outlet 120 (FIG. 3) of the inlet chamber 100 leads to the metering valve inlet 66. So that fuel is available at the metering valve 28 at all times when fuel is within the inlet chamber 100, the outlet 120 may be an open passage without any intervening valve, in at least some implementations. The outlet 120 may extend from the bottom or a lower portion of the inlet chamber so that fuel may flow under atmospheric pressure to the metering valve 28.

In use of the throttle body assembly 10, fuel is maintained in the inlet chamber 100 as described above and thus, in the outlet 120 and the metering valve inlet 66. When the metering valve 28 is closed, there is no, or substantially no, fuel flow through the valve seat 86 and so there is no fuel flow to the metering valve outlet 70 or to the throttle bore 20. To provide fuel to the engine, the metering valve 28 is opened and fuel flows into the throttle bore 20, is mixed with air and is delivered to the engine as a fuel and air mixture. The timing and duration of the metering valve opening and closing may be controlled by a suitable microprocessor or other controller. The fuel flow (e.g. injection) timing, or when the metering valve 28 is opened during an engine cycle, can vary the pressure signal at the outlet 70 and hence the differential pressure across the metering valve 28 and the resulting fuel flow rate into the throttle bore 20. Further, both the magnitude of the engine pressure signal and the airflow rate through the throttle valve 52 change significantly between when the engine is operating at idle and when the engine is operating at wide open throttle. In conjunction, the duration that the metering valve 28 is opened for any given fuel flow rate will affect the quantity of fuel that flows into the throttle bore 20.

The inlet chamber 100 may also serve to separate liquid fuel from gaseous fuel vapor and air. Liquid fuel will settle into the bottom of the inlet chamber 100 and the fuel vapor and air will rise to the top of the inlet chamber where the fuel vapor and air may flow out of the inlet chamber through the vent passage 102 or vent outlet (and hence, be delivered into the intake manifold and then to an engine combustion chamber). To control the venting of gasses from the inlet chamber 100, a vent valve 130 may be provided at the vent passage 102. The vent valve 130 may include a valve element 132 that is moved relative to a valve seat 134 to selectively permit fluid flow through the vent or vent passage 102. To permit further control of the flow through the vent passage 102, the vent valve 130 may be electrically actuated to move the valve element 132 between open and closed positions relative to the valve seat 134.

Figure 5:
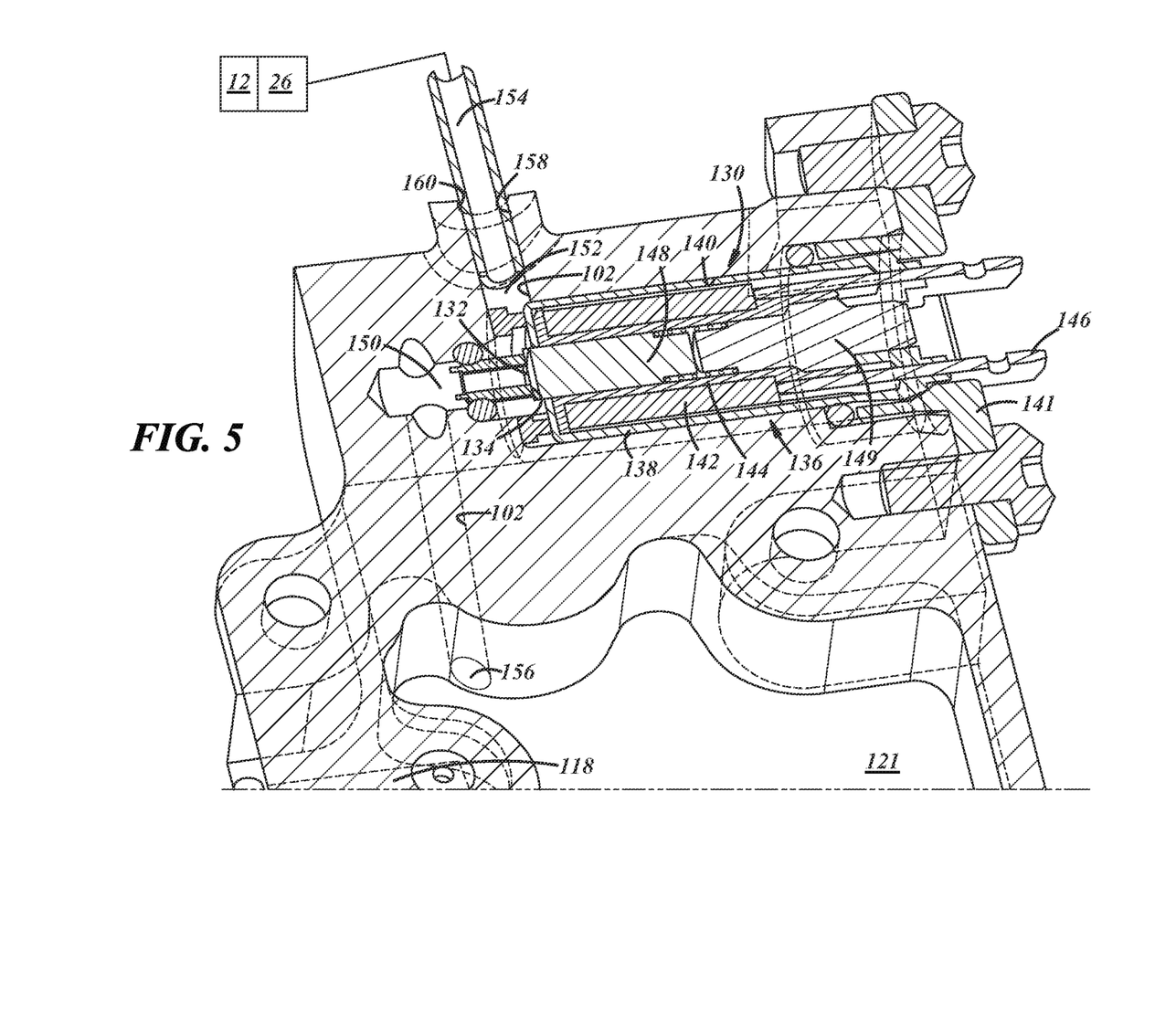
FIG. 5 is fragmentary perspective sectioned view of a cover and vent valve carried by the cover.

As shown in FIGS. 4 and 5, to control actuation and movement of a valve element 132, the vent valve 130 may include or be associated with an electrically driven actuator such as (but not limited to) a solenoid 136. Among other things, the solenoid 136 may include an outer casing 138 received within a cavity 140 in the throttle body 18 or cover 118 and retained therein by a retaining plate or body 141, a coil 142 wrapped around a bobbin 144 received within the casing 138, an electrical connector 146 arranged to be coupled to a power source to selectively energize the coil 142, an armature 148 slidably received within the bobbin 144 for reciprocation between advanced and retracted positions and an armature stop 149. The valve element 132 may be carried by or otherwise moved by the armature 148 relative to a valve seat 134 that may be defined within one or more of the solenoid 136, the throttle body 18 and the cover 118. When the armature 148 is in its retracted position, the valve element 132 is removed or spaced from the valve seat 134 and fuel may flow through the valve seat. When the armature 148 is in its extended position, the valve element 132 may be closed against or bears on the valve seat 134 to inhibit or prevent fuel flow through the valve seat. The solenoid 136 may be constructed as set forth in U.S. patent application Ser. No. 14/896,764. An inlet 150 from the vent passage to the valve seat 134 may be centrally or generally coaxially located with the valve seat 134, and an outlet 152 from the valve seat to the downstream portion of the vent passage 102 may be radially outwardly spaced from the inlet and generally radially outwardly oriented. Of course, other valves, including but not limited to different solenoid valves (including but not limited to piezo type solenoid valves) or other electrically actuated valves may be used instead if desired in a particular application.

The vent passage 102 or vent outlet could be coupled to a filter or vapor canister that includes an adsorbent material, such as activated charcoal, to reduce or remove hydrocarbons from the vapor. The vent passage 102 could also or instead be coupled to an intake manifold of the engine where the vapor may be added to a combustible fuel and air mixture provided from the throttle bore 20. In this way, vapor and air that flow through the vent valve 130 are directed to a downstream component as desired. In the implementation shown, an outlet passage 154 extends from the cover 118 downstream of the valve seat 134 and to an intake manifold of the engine. While the outlet passage 154 is shown as being defined at least in part in a conduit that is routed outside of the cover 118 and throttle body 18, the outlet passage 154 could instead be defined at least in part by one or more bores or voids formed in the throttle body and/or cover, and or by a combination of internal voids/passages and external conduit(s).

In at least some implementations, the cover 118 defines part of the inlet chamber 100 and the vent passage 102 extends at least partially within the cover and communicates at a first end 156 with the inlet chamber 100 and at a second end 158 with an outlet 160 from the throttle body (e.g. the cover). The vent valve 130 and valve seat 132 are disposed between the first and second ends 156, 158 of the vent passage 102 so that the vent valve controls the flow through the vent passage. In the implementation shown, the vent passage 102 is entirely within the cover 118, and the vent valve 130 is carried by the cover, e.g. within the cavity 140 formed in the cover.

In at least some implementations, a pressure in the vent passage 102 can interfere with the fuel flow from the inlet chamber 100 to the fuel metering valve 28 and throttle bore 20. For example, when the vent passage 102 is communicated with the intake manifold or with an air cleaner box/filter, a subatmospheric pressure may exist within the vent passage. The subatmospheric pressure, if communicated with the inlet chamber 100, can reduce the pressure within the inlet chamber and reduce fuel flow from the inlet chamber. Accordingly, closing the vent valve 130 can inhibit or prevent communication of the subatmospheric pressure from the vent passage 102 with the inlet chamber 100. A pressure sensor responsive to pressure in the vent passage 102 or in, for example, the intake manifold, may provide a signal that is used to control, at least in part, the actuation of the vent valve 130 as a function of the sensed pressure to improve control over the pressure in the inlet chamber. Also or instead, the vent valve 130 may be closed to permit some positive, superatmospheric pressure to exist within the inlet chamber 100 which may improve fuel flow from the inlet chamber to the throttle bore 20. And the vent valve 130 may be opened to permit engine pressure pulses (e.g. from the intake manifold) to increase the pressure within the inlet chamber 100. As noted above, the opening of the vent valve 130 may be timed with such pressure pulses by way of a pressure sensor or otherwise. These examples permit better control over the fuel flow from the inlet chamber 100 and thus, better control of the fuel and air mixture delivered from the throttle bore 20. In this way, the vent valve 130 may be opened and closed as desired to vent gasses from the inlet chamber 100 and to control the pressure within the inlet chamber.

Still further, it may be desirable to close the vent passage 102 to avoid the fuel in the inlet chamber 100 from going stale over time (due to evaporation, oxidation or otherwise), such as during storage of the device with which the throttle body assembly 10 is used. In this way, the vent valve 130 may be closed when the device is not being used to reduce the likelihood or rate at which the fuel in the throttle body assembly 10 becomes stale.

Finally, when the vent valve strokes from open to closed, the armature 148 and valve element 132 movement displace air/vapor in the vent passage 102 toward and into the inlet chamber 100 which may raise the pressure in the inlet chamber. Repeated actuations of the vent valve 130 may then provide some pressure increase, even if relatively small, that facilitates fuel flow from the inlet chamber 130 to the throttle bore 20.

In at least some implementations, the pressure within the inlet chamber 100 may be controlled by actuation of the vent valve 130, to be between 0.34 mmHg to 19 mmHg. In at least some implementations, the vent valve 130 may be opened and closed repeatedly with a cycle time of between 1.5 ms to 22 ms. And in at least some implementations, the vent valve 130 may be controlled at least when the throttle valve is at least 50% of the way between its idle and wide open positions (e.g. between 50% and 100% of the angular rotation from idle to wide open), for example, because the intake manifold pressure may be greater in that throttle position range and thus, more likely to interfere with the pressure in the inlet chamber.

The vent valve 130 may be actuated by a controller 162 (FIG. 1) that controls when electrical power is supplied to the solenoid 136. The controller 162 may be the same controller that actuates the fuel metering valve 28 or a separate controller. Further, the controller 162 that actuates one or both of the vent valve 130 and the fuel metering valve 28 may be mounted on or otherwise carried by the throttle body assembly 10, or the controller may be located remotely from the throttle body assembly, as desired. In the example shown, the controller 162 is carried within a sub-housing 164 that is mounted to the throttle body 18 and/or cover 118, or otherwise carried by the housing (e.g. the body and/or cover), and which may include a printed circuit board 166 and a suitable microprocessor 168 or other controller for actuation of the metering valve 28, vent valve 130 and/or the throttle valve (e.g. when rotated by a motor 62 as shown and described above). Further, information from one or more sensors maybe used to control, at least in part, operation of the vent valve, and the sensor(s) may be communicated with the controller that controls actuation of the vent valve.

As shown in FIG. 6, a fuel system 200 may include a fuel tank 202, a throttle body assembly 10 and an engine 12 having an intake manifold 26. The fuel tank 202 may include an interior 204 in which a supply of liquid fuel 206 is maintained for delivery to the engine 12 via the throttle body assembly 10 as set forth above. The liquid fuel may flow from the fuel tank 202 (under the force of gravity or via a pump) through a first conduit 208 to the inlet chamber 100 of the throttle body assembly 10. From the inlet chamber 100, the liquid fuel may flow to the throttle bore 20, and from the throttle bore to the intake manifold 26 of the engine 12 in a fuel and air mixture (the flow from the throttle bore to the intake manifold is diagrammatically shown as occurring through a conduit 210, but a conduit is not necessary when the throttle body 18 is mounted to the intake manifold 26). The inlet chamber 100 may be vented to the intake manifold 26 via a second conduit 212, and gaseous flow through the second conduit may be controlled by a valve 130, such as a solenoid valve, as set forth above.

Further, an upper region 214 of the fuel tank 202 includes air and fuel vapor above the level of liquid fuel 206. This upper or vapor region 214 of the fuel tank 202 may be communicated with the inlet chamber 100 via a third conduit 216 so that the fuel tank air/vapor (e.g. gaseous matter) may be vented in the same manner that the inlet chamber 100 is vented, with the gaseous flow also controlled by the inlet chamber vent valve 130. Hence, a single vent valve 130 may be used to control the venting of gasses from both the inlet chamber 100 of the throttle body assembly 10 and the fuel tank 202. In this way, an internal pressure within the tank 202 may be controlled, and this may be done without a separate vent valve carried by the fuel tank. Because a vent outlet 218 and conduit 216 can be closed off by the inlet chamber vent valve 130, fuel will not leak from the fuel tank 202 via the vent opening or conduit, for example, if the fuel tank is inverted. Thus, a costly and more complex roll-over valve (i.e. a valve that closes the fuel tank vent outlet 218 if the fuel tank is inverted) is not needed in this fuel system 200 as is commonly used when a separate vent valve is connected to the fuel tank.

The vent valve 130 may be controlled in any desired manner to effect proper venting of both the inlet chamber 100 and the fuel tank 202, including the manner(s) set forth herein above. Further venting schemes may be used to facilitate adding fuel to the fuel tank whereupon a refueling event is detected and the vent valve 130 is opened, or cycled between opened and closed positions, to permit vapor and air to escape from the fuel tank and facilitate adding fuel into the fuel tank. Of course, other venting schemes and control methods may be employed, as desired.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A charge forming device for a combustion engine, comprising:
    a housing having an inlet chamber in which a supply of fuel is received, a vent passage communicating with the inlet chamber and a throttle bore with an inlet through which air is received;
    a throttle valve carried by the housing with a valve head movable relative to the throttle bore to control fluid flow through the throttle bore; and
    a vent valve carried by the housing and having a valve element that is movable between an open position wherein fluid may flow from the inlet chamber through the vent passage and a closed position where fluid is prevented or inhibited from flowing out of the inlet chamber through the vent passage, the vent valve being electrically actuated, wherein the vent valve is actuated as a function of a pressure within the inlet chamber or the vent passage.

2. The system of claim 1 wherein the vent valve is actuated to maintain a pressure within the inlet chamber of between 0.34 mmHg to 19 mmHg.

3. The system of claim 1 which includes a controller carried by the housing, and a pressure sensor communicated with the controller, and wherein the pressure sensor is responsive to pressure in the vent passage or the intake manifold, and wherein the controller causes the valve element to move to the closed position when there is a subatmospheric pressure in said vent passage or intake manifold.

4. The system of claim 3 wherein the controller causes the valve element to move to the open position when there is a superatmospheric pressure in said vent passage or intake manifold to provide a superatmospheric pressure signal to the inlet chamber.

5. The system of claim 1 which includes a controller carried by the housing, and a pressure sensor communicated with the controller, wherein the pressure sensor is responsive to pressure in the inlet chamber, and wherein the controller causes the valve element to move to the closed position until a threshold superatmospheric pressure exists in the inlet chamber.

6. The system of claim 1 which also includes a fuel tank having a fuel outlet communicating with the inlet chamber, and the fuel tank having a vent outlet communicating with at least one of the inlet chamber and the vent passage wherein, when the valve element is in the open position gaseous matter may flow from the vent outlet of the fuel tank to one or both of the throttle bore and the intake manifold, and when the valve element is in the closed position gaseous matter is prevented or inhibited from flowing out of the vent outlet of the fuel tank.

7. The system of claim 6 wherein, when the valve element is in the closed position, liquid fuel in the fuel tank is prevented from flowing out of the vent outlet of the fuel tank.

8. The system of claim 1 wherein the housing includes a body and a cover, and the vent passage is formed entirely in the cover.

9. A method of operating a vent valve for a charge forming device, wherein the charge forming device includes a housing having an inlet chamber in which a supply of fuel is received, a vent passage communicating with the inlet chamber and a throttle bore with an inlet through which air is received, a throttle valve carried by the housing with a valve head movable relative to the throttle bore to control fluid flow through the throttle bore, wherein the method comprises the following steps:
    determining a pressure within the inlet chamber or the vent passage or an intake manifold of an engine with which the charge forming device used;
    controlling the vent valve as a function of the determined pressure.

10. The method of claim 9 wherein the step of controlling the vent valve is accomplished by closing the vent valve when the determined pressure is subatmospheric.

11. The method of claim 9 wherein the step of controlling the vent valve is accomplished by opening the vent valve when the determined pressure is superatmospheric.

12. The method of claim 11 wherein the opening of the valve is timed with pressure pulses created in the engine.

13. The method of claim 9 wherein the determined pressure is a pressure within the inlet chamber and wherein the step of controlling the vent valve is accomplished by opening the vent valve when the determined pressure is greater than a threshold pressure.

14. The method of claim 13 wherein the threshold pressure is between 0.34 mmHg and 19 mmHg.

15. The method of claim 9 wherein the vent valve is opened and closed repeatedly with a cycle time between 1.5 ms to 22 ms.

* * * * *